US010307641B2

(12) United States Patent
Orfield

(10) Patent No.: US 10,307,641 B2
(45) Date of Patent: Jun. 4, 2019

(54) EXERCISE TRACKER

(71) Applicant: Nolan Orfield, Ann Arbor, MI (US)

(72) Inventor: Nolan Orfield, Ann Arbor, MI (US)

( * ) Notice: Subject to any disclaimer, the term of this patent is extended or adjusted under 35 U.S.C. 154(b) by 0 days.

(21) Appl. No.: 15/444,419

(22) Filed: Feb. 28, 2017

(65) Prior Publication Data
US 2017/0173392 A1    Jun. 22, 2017

Related U.S. Application Data

(63) Continuation of application No. 14/972,312, filed on Dec. 17, 2015, now Pat. No. 9,616,292.
(Continued)

(51) Int. Cl.
*A63B 21/00* (2006.01)
*A63B 21/06* (2006.01)
(Continued)

(52) U.S. Cl.
CPC .......... *A63B 24/0062* (2013.01); *A63B 21/06* (2013.01); *A63B 21/0628* (2015.10);
(Continued)

(58) Field of Classification Search
CPC .......... A63B 21/0004; A63B 21/00058; A63B 21/00061; A63B 21/00065; A63B 21/00069; A63B 21/02; A63B 21/04; A63B 21/0407; A63B 21/0414; A63B 21/0421; A63B 21/0428; A63B 21/0435; A63B 21/0442; A63B 21/045; A63B 21/0455; A63B 21/055; A63B 21/0552; A63B 21/0555; A63B 21/0557; A63B 21/06; A63B 21/062; A63B 21/0624; A63B 21/0626; A63B 21/0628; A63B 21/063; A63B 21/15; A63B 21/151; A63B 21/152; A63B 21/4033; A63B 21/4034;
(Continued)

(56) References Cited

U.S. PATENT DOCUMENTS 3,387,493 A    6/1968   Strittmatter
4,907,795 A *   3/1990   Shaw ................. A63B 24/0062
                                                                    482/9
(Continued)

FOREIGN PATENT DOCUMENTS

CN      201464091 U    5/2010
CN      202087001 U    12/2011
(Continued)

OTHER PUBLICATIONS

International Search Report and Written Opinion for PCT/US2015/066556 dated Feb. 23, 2016 (11 pages).
(Continued)

*Primary Examiner* — Gary D Urbiel Goldner
(74) *Attorney, Agent, or Firm* — Stephen J. Kontos; PatentXP PLLC

(57) ABSTRACT

An exercise tracker includes a force sensor programmed to output a force signal representing a force applied to a cable associated with a piece of exercise equipment. The exercise tracker further includes a processing device programmed to receive the force signal and determine, from the force signal, exercise data including an amount of weight lifted.

20 Claims, 6 Drawing Sheets

Related U.S. Application Data

(60) Provisional application No. 62/101,702, filed on Jan. 9, 2015.

(51) Int. Cl.

| | | |
|---|---|---|
| *A63B 22/00* | (2006.01) | |
| *A63B 23/04* | (2006.01) | |
| *A63B 24/00* | (2006.01) | |
| *A63B 71/06* | (2006.01) | |
| *A63B 21/055* | (2006.01) | |
| *A63B 21/062* | (2006.01) | |
| *G09B 5/00* | (2006.01) | |
| *H04M 1/725* | (2006.01) | |

(52) U.S. Cl.
CPC ........ *A63B 21/151* (2013.01); *A63B 22/0076* (2013.01); *A63B 71/0622* (2013.01); *A63B 21/00061* (2013.01); *A63B 21/00069* (2013.01); *A63B 21/0552* (2013.01); *A63B 21/4034* (2015.10); *A63B 21/4035* (2015.10); *A63B 23/0494* (2013.01); *A63B 2022/0079* (2013.01); *A63B 2071/065* (2013.01); *A63B 2220/17* (2013.01); *A63B 2220/40* (2013.01); *A63B 2220/51* (2013.01); *A63B 2220/56* (2013.01); *A63B 2220/805* (2013.01); *A63B 2225/02* (2013.01); *A63B 2225/15* (2013.01); *A63B 2225/50* (2013.01); *G09B 5/00* (2013.01); *H04M 1/7253* (2013.01)

(58) Field of Classification Search
CPC ............ A63B 21/4035; A63B 21/4045; A63B 22/0046; A63B 22/0076; A63B 22/0087; A63B 22/0089; A63B 2022/0079; A63B 24/0003; A63B 24/0021; A63B 24/0062; A63B 2024/0065; A63B 69/06; A63B 2069/062; A63B 71/06; A63B 71/0619; A63B 71/0622; A63B 2071/065; A63B 2220/17; A63B 2220/40; A63B 2220/50; A63B 2220/51; A63B 2220/52; A63B 2220/56; A63B 2220/58; A63B 2220/80; A63B 2220/805; A63B 2220/83; A63B 2220/833; A63B 2225/02; A63B 2225/15; A63B 2225/20; A63B 2225/50; A63B 2225/52; A63B 2225/54; A63B 2230/75; A63B 2230/755

See application file for complete search history.

(56) References Cited

U.S. PATENT DOCUMENTS

| | | | |
|---|---|---|---|
| 4,979,733 A | 12/1990 | Prud'Hon | |
| 5,195,937 A * | 3/1993 | Engel | A63B 21/015 |
| | | | 482/116 |
| 5,302,161 A * | 4/1994 | Loubert | A63B 21/015 |
| | | | 482/116 |
| 5,362,298 A | 11/1994 | Brown et al. | |
| 5,655,997 A | 8/1997 | Greenberg et al. | |
| 5,785,632 A | 7/1998 | Greenberg et al. | |
| 6,224,519 B1 | 5/2001 | Doolittle | |
| 6,231,481 B1 | 5/2001 | Brock | |
| 6,280,361 B1 | 8/2001 | Harvey | |
| 6,342,028 B1 | 1/2002 | de Sane | |
| 6,358,188 B1 | 3/2002 | Ben-Yehuda et al. | |
| 7,455,621 B1 | 11/2008 | Anthony | |
| 8,337,365 B2 | 12/2012 | Kim et al. | |
| 8,992,385 B2 | 3/2015 | Lemos | |
| 9,041,922 B1 | 5/2015 | Orfield | |
| 2003/0032529 A1 | 2/2003 | Alessandri et al. | |
| 2003/0153438 A1* | 8/2003 | Gordon | A63B 22/02 |
| | | | 482/92 |
| 2004/0176226 A1* | 9/2004 | Carlson | A63B 21/0083 |
| | | | 482/112 |
| 2004/0235623 A1 | 11/2004 | Martinez | |
| 2005/0272577 A1 | 12/2005 | Olson et al. | |
| 2006/0035768 A1 | 2/2006 | Kowallis | |
| 2006/0053897 A1* | 3/2006 | Kuivala | A63B 21/00 |
| | | | 73/818 |
| 2006/0135325 A1* | 6/2006 | Holness | A63B 21/0023 |
| | | | 482/94 |
| 2006/0229164 A1* | 10/2006 | Einav | A63B 21/00 |
| | | | 482/9 |
| 2007/0135264 A1 | 6/2007 | Rosenberg | |
| 2008/0242509 A1 | 10/2008 | Menktchiev | |
| 2008/0242512 A1 | 10/2008 | Kim | |
| 2009/0312162 A1 | 12/2009 | Maiaro | |
| 2010/0173758 A1 | 7/2010 | Piane, Jr. | |
| 2010/0197462 A1 | 8/2010 | Piane, Jr. | |
| 2011/0112771 A1 | 5/2011 | French | |
| 2012/0004076 A1 | 1/2012 | Fenster | |
| 2012/0053014 A1* | 3/2012 | Zhu | A63B 21/00069 |
| | | | 482/5 |
| 2012/0094804 A1 | 4/2012 | Bell et al. | |
| 2013/0231574 A1 | 9/2013 | Tran | |
| 2013/0296144 A1 | 11/2013 | Gvoich | |
| 2014/0038777 A1* | 2/2014 | Bird | A63B 21/0058 |
| | | | 482/5 |
| 2014/0121071 A1 | 5/2014 | Strom | |
| 2014/0142864 A1* | 5/2014 | Spears | A61B 5/1112 |
| | | | 702/19 |
| 2014/0228175 A1 | 8/2014 | Lemos | |
| 2014/0235409 A1 | 8/2014 | Salmon et al. | |
| 2014/0248996 A1 | 9/2014 | Adel | |
| 2014/0287876 A1* | 9/2014 | Etter | A63B 24/0087 |
| | | | 482/5 |
| 2015/0182773 A1* | 7/2015 | Olson | A63B 21/00192 |
| | | | 482/8 |
| 2015/0367162 A1* | 12/2015 | Mueller | A63B 21/0058 |
| | | | 482/94 |
| 2016/0158603 A1* | 6/2016 | Darwood | G06F 19/3481 |
| | | | 482/5 |

FOREIGN PATENT DOCUMENTS

| | | |
|---|---|---|
| CN | 102861422 A | 1/2013 |
| CN | 103721389 A | 4/2014 |
| DE | 9307657 U1 | 9/1993 |

OTHER PUBLICATIONS

International Preliminary Report on Patentability for PCT/US2015/088568 dated Jul. 20, 2017 (7 pages).

Extended European Search REport for EP 15877335.8 dated Jul. 6, 2018 (7 pages).

CNIPA Office Action for Application No. 201580072703.8 dated Sep. 19, 2018 (7 pages).

CNIPA Office Action dated Apr. 4, 2019 for CN Application No. 201580072703.8.

* cited by examiner

EXERCISE TRACKER

CROSS-REFERENCE TO RELATED APPLICATION

This application claims priority to U.S. Ser. No. 14/972,312 filed on Dec. 17, 2015 and titled "Exercise Tracker," the contents of which are hereby incorporated by reference in their entirety, and to U.S .Provisional Application Ser. No. 62/101,702 filed on Jan. 9, 2015and titled "Apparatus and Method for Tracking Exercise Equipment Usage," the contents of which are hereby incorporated by reference in their entirety.

BACKGROUND

The advent of wearable monitors, such as pedometers and heart rate monitors, coupled with the increasing ease with which digital data can be recorded via wireless communication has led to a proliferation of technologies that allow users to track their physical fitness activities. Fitness trackers that communicate directly with a user's mobile phone or computer through Bluetooth®, for example, have become common.

Services that aggregate data from multiple monitoring devices and allow users to share data and "compete" with friends has increased the utility of the technologies by motivating individuals to achieve their wellness goals.

DETAILED DESCRIPTION

Despite the increased interest in digitizing and recording users' fitness activity, known fitness trackers do not adequately capture the activity performed on weight-lifting exercise equipment traditionally found in homes and private gyms. Thus, a device which can integrate this significant aspect of physical fitness into the expanding ecosystem of the "quantified self" would be beneficial.

One solution involves an exercise tracker that can detect repetitions performed on a piece of exercise equipment, especially one that requires a user to tension a cable to provide resistance. An example exercise tracker that can detect repetitions performed on exercise equipment includes a force sensor programmed to output a force signal representing a force applied to a cable associated with the piece of exercise equipment. The exercise tracker further includes a processing device programmed to receive the force signal and determine, from the force signal, exercise data including an amount of weight lifted and a number of repetitions performed.

The exercise data can be transmitted to and viewed by the user of the exercise equipment. In some instances, the exercise data may be transmitted to a remote server. The user can view the exercise data by accessing the data stored on the remote server via, e.g., a computing device such as a smartphone, tablet computer, a desktop computer, a laptop computer, or the like.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
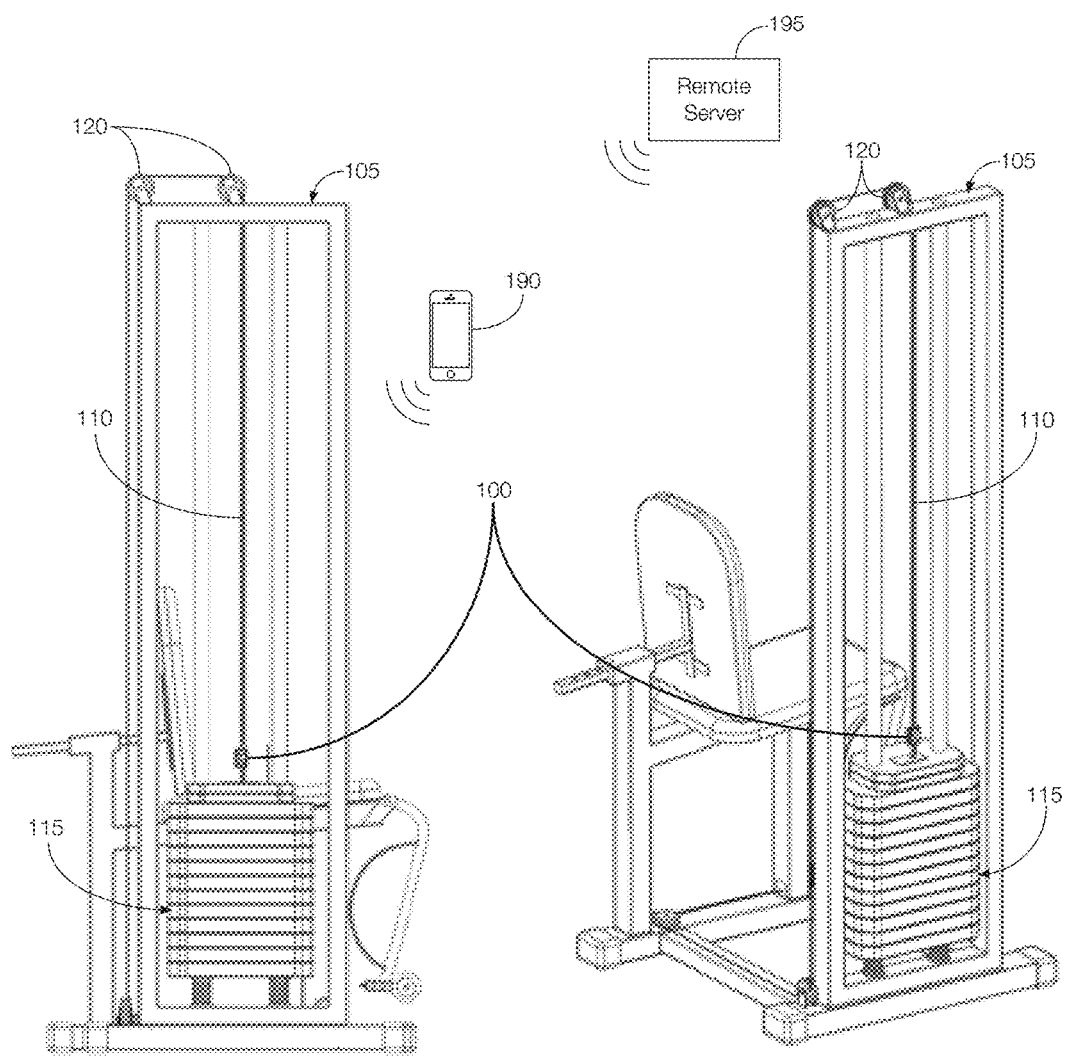
FIG. 1 illustrates an example exercise tracker mounted to a sample piece of exercise equipment.

As shown in FIG. 1, an exercise tracker 100 may be mounted to exercise equipment 105 by fastening it directly to a cable 110 used to elevate or otherwise move a stack of weights 115 when performing a "repetition" or "rep." The exercise equipment 105 is shown as a leg extension machine but could alternatively be any exercise device that has a cable 110 that is pulled taut or otherwise tensioned with each repetition. Thus, the exercise equipment 105 shown is one example of many possible configurations of exercise equipment 105 that use the elevation of a stack of variable weights 115 to specify the resistance for an exercise routine. Further, instead of a weight-based exercise machine, the exercise tracker 100 may be used with, e.g., a rowing machine, a machine with bendable rods or other form of resistance caused by moving a cable, resistance bands, or the like.

In one possible approach, the exercise tracker 100 may be disposed on the cable 110 near the stack of weights 115. In other implementations, the exercise tracker 100 may be mounted elsewhere on the cable 110. The exercise tracker 100 may be mounted on a cable 110 travelling horizontally, vertically, or in any other orientation. Moreover, the exercise tracker 100 may be fixed relative to the cable 110 so that it moves in accordance with the movement of the cable 110. Alternatively, the exercise tracker 100 may be fixed relative to the exercise equipment 105 so that the cable 110 moves independently of the exercise tracker 100.

The cable 110 may have a generally circular cross section. Alternatively, the cable 110 may have a generally flat (i.e., a belt) or another cross-sectional shape. Sometimes, exercise equipment 105 with cables 110 will incorporate pulleys 120 that, e.g., allow the weight to move in a single direction regardless of the way the cable 110 is pulled. For instance, a pulley may allow the weight to move vertically upward during a repetition even though the cable 110 is pulled vertically downward, horizontally, or at another angle relative to the movement of the weight. Accordingly, the exercise tracker 100 may be positioned on the cable 110 at a location that will not conflict with the pulley. For instance, the exercise tracker 100 may be located on the cable 110 at a location far enough away from the pulley that it will not contact the pulley during a repetition. In implementations where a pulley cannot be avoided, such as implementations where the exercise tracker 100 must travel through a pulley to accurately count the repetition, the exercise tracker 100 may have a configuration that allows the exercise tracker 100 to travel through or otherwise avoid interfering with the pulley. If an end of the cable 110 is fixed, the exercise tracker 100 could also be mounted near this terminal such that it does not move even as the weights are raised and lowered.

Further, using pulleys 120 saves space by reducing the footprint of the exercise equipment 105 and may sometimes allow for a single piece of exercise equipment 105 to be used for different types of exercises using the same stack of weights 115. The different types of exercises may require the engagement of different cables 110 or moving the cables 110 in different directions. In these instances, for example, multiple exercise trackers 100 may be installed on one or more cables 110 specific to individual exercise motions to differentiate which activities are being performed and logged. Thus, although only one exercise tracker 100 is shown, the exercise equipment 105 or the cable 110 may support multiple exercise trackers 100.

Figure 2:
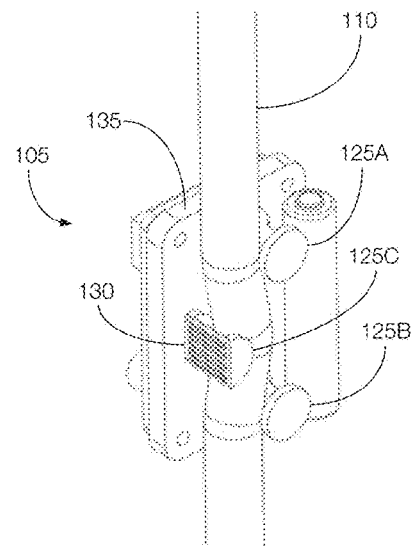
FIG. 2 illustrates an example exercise tracker mounted to a cable of a sample piece of exercise equipment.

Referring now to FIG. 2, the exercise tracker 100 may include one or more protrusions 125 and a force sensor 130 disposed on a base 135. Other components of the exercise tracker 100 are illustrated in, and discussed below with reference to, FIG. 5. In one possible implementation, the base 135 and protrusions 125 may be formed from a unitary construction. Alternatively, the protrusions 125 may be disposed on the base 135 via, e.g., an adhesive, a fastener, or the like. Further, the base 135 and protrusions 125 may be formed from a relatively rigid material such as plastic or metal. In some possible approaches, the base 135 may include clips for receiving the power source, the force sensor 130, or both.

The protrusions (collectively 125), as shown in FIG. 2, may be implemented as a first pin 125A, a second pin 125B, and a middle pin 125C. As discussed in greater detail below, the protrusions 125 may take different forms. For instance, the protrusions 125 may have circular or non-circular cross-sections, and the shape of one protrusion 125 may be different from the shape of one or more other protrusions 125. One or more of the protrusions 125 may be connected to another protrusion to promote structural rigidity. The protrusions 125 may be arranged on the base 135 in a way that allows the cable 110 to contact each of the protrusions 125. For instance, the cable 110 may be in contact with each protrusion 125, including the middle pin 125C that may house or otherwise support the force sensor 130, although all or any combination of protrusions 125 could support a force sensor 130 to provide the utility described herein. As illustrated in FIG. 2, the cable 110 may be routed such that it passes by, and contacts, each of the protrusions 125. When the exercise tracker 100 is mounted on the cable 110, the protrusions 125 may therefore deflect the cable 110 by a known magnitude or angle. When tension is applied to the cable 110 (i.e. the stack of weights 115 is lifted during a repetition), a force proportional to that tension may be applied to one or more protrusions 125, such as the middle pin 125C.

One or more of the protrusions 125 may be fixed relative to the base 135. Alternatively, one or more protrusions 125 may rotate in order to provide less friction when the cable 110 is moving. The locations of the three protrusions 125 relative to one another allows the tension on the cable 110 to be measured, after calibration, for a suitable range of cable 110 diameters. In some implementations, certain protrusion 125 locations may be adjustable. For instance, the location of the middle pin 125C may be adjusted via a positioning screw. In another approach, calibration clips, or shims, can be added to effectively alter the size of the protrusion 125 to accommodate a wider variety of cable diameters. Furthermore, the geometry of the protrusions 125 can be configured such that they can accommodate cables 110 with circular, rectangular, or any geometry of cross-section equally well. The terms "protrusion" and "pin" is used here to describe an element used to shape the cable 110 into the desired position and does not limit the shape of the structure to a circular cylinder, as a variety of shapes may be used to provide the same purpose.

The force sensor 130 (which may also be referred to as a load sensor or tension meter) may include any device configured to output signals (see FIG. 3) representing the amount of force applied by the cable 110 when the cable 110 is, e.g., tensioned. Tensioning the cable 110 (i.e., pulling the cable 110 taut) removes slack from the cable 110 and may apply a force to one of the protrusions, e.g., the middle pin 125C. The magnitude and profile of the force applied may be associated with the amount the middle pin 125C deflects. The force sensor 130 may measure the deflection of the middle pin 125C and output a force signal that represents the magnitude of the force. For instance, fluctuations of the force sensor 130 signal corresponding to acceleration of the weights as they are raised and lowered can be counted to indicate the number of repetitions. In another approach, the force sensor 130 may output the force signal each time the magnitude crosses a predetermined threshold. The predetermined threshold may be based on the magnitude of the force applied that is consistent with performing a repetition.

Figure 3:
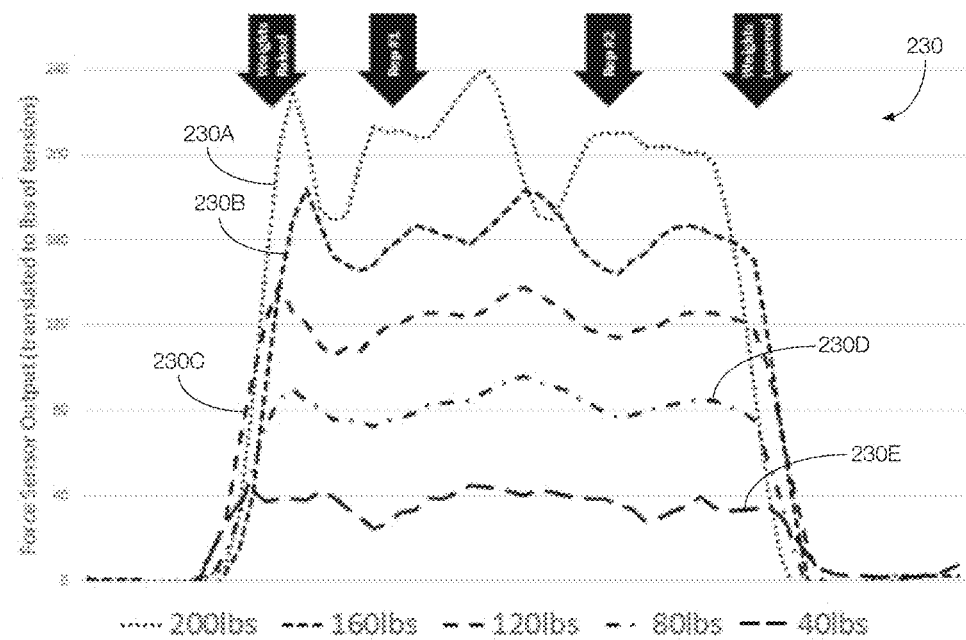
FIG. 3 illustrates example data collected by the force sensor incorporated into the exercise tracker.

FIG. 3 illustrates example real-time data 230 that may be collected by the force sensor 130. The data 230 may represent how the output of the force sensor 130 changes during a repetition and with a different amount of weight 115 attached to the cable 110. For instance, the line 203A may represent repetitions of an exercise performed at a weight of 200 lbs. The line 230B may represent repetitions of an exercise performed at a weight of 160 lbs. The line 230C may represent repetitions of an exercise performed at a weight of 120 lbs. The line 230D may represent repetitions of an exercise performed at a weight of 80 lbs. The line 230E may represent repetitions of an exercise performed at a weight of 40 lbs. The various "peaks," "valleys," and "plateaus" in the data 230 may indicate when a repetition has been performed. For instance, a repetition may be performed after the data 230 indicates a certain number of "peaks," "valleys," and "plateaus" have been observed. The data profile for a repetition may be based on the amount of weight 115 lifted. For instance, the "peaks," "valleys," and "plateaus" for line 230A may be different from those for line 230E since the weights are different.

Figure 4A:
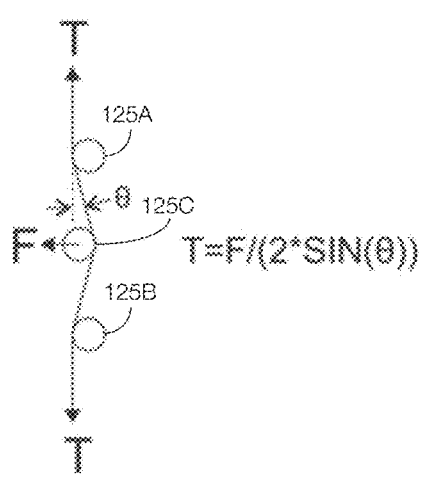
FIGS. 4A-4B are example free body diagrams illustrating forces acting on the exercise tracker.

FIG. 4A is an example free body diagram illustrating one example relationship between the tension Tin the cable 110 and the force F observed by the middle pin 125C. As discussed above, the force sensor 130 attached to the middle pin 125C may detect the force F to measure the amount of weight being lifted. In one possible implementation, the force sensor 130 may include a strain gauge (e.g., a metal foil gauge) fixed directly to one of the protrusions 125 or an optical sensor such as an infrared (IR) emitter receiver pair. Since the middle pin 125C may be a cantilevered body designed to deflect an amount proportional to the force applied, the force may be measured by the strain gauge, which may include a metallic foil with an electrical resistance that changes based on the amount of deflection, or the optical sensor. The change in resistance may be amplified via, e.g., a Wheatstone bridge circuit or other type of amplification circuit. In a different approach, the lateral force exerted on one or more of the protrusions 125 may be measured via a piezoresistive force sensor, a hydraulic pressure sensor, etc.

In an alternative approach, a sensor other than a strain gauge may be used. For example, a pressure transducer, a thin film pressure sensor, or any other force-measuring sensor could be employed. Additionally or in the alternative, the one or more protrusions 125 supporting the load sensor 130 may be replaced by a sliding element that slides in a direction perpendicular to the cable 110 when tension is applied. In another possible approach, the one or more protrusions 125 supporting the load sensor 130 may be movable via a pivoting arm rather than sliding within a track.

Figure 4B:
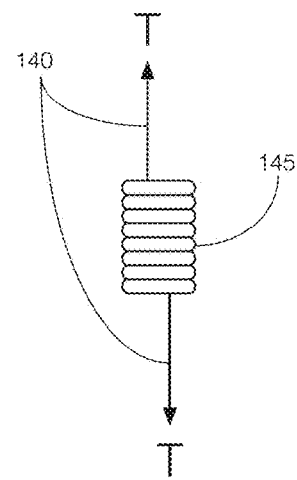

The preceding disclosure has assumed that the exercise tracker 100 attaches to a continuous cable segment. In implementations where the cable 110 is separated into multiple segments 140 (e.g., the cable 110 is cut to accommodate the exercise tracker 100 or the exercise tracker 100 is used to attach two ends of different cables 110 together), the tension can be measured directly via any number of other approaches. For instance, a spring 145 (see FIG. 4B) resisting the movement can allow the applied force to be determined based on a measurement of the amount of deflection in response to the tension applied to one or both segments 140 of the cable 110.

Figure 5:
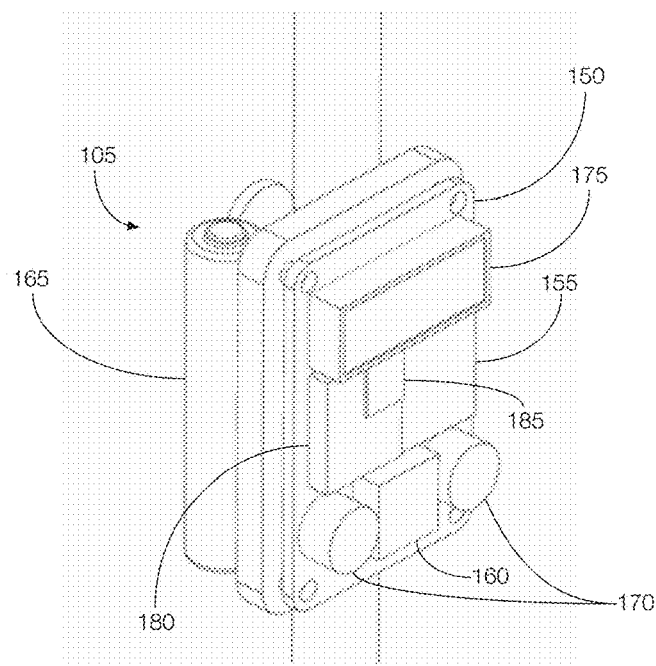
FIG. 5 depicts example components of the exercise tracker.

FIG. 5 illustrates another view of the exercise tracker 100 mounted to a cable 110 with additional example elements mounted to the base 135. The additional example elements shown in FIG. 5 include a circuit board 150, a wireless communication device 155, an accelerometer 160, a battery 165, buttons 170, and a display screen 175. These components may be mounted, directly or indirectly, to the base 135.

The circuit board 150 may include a printed circuit board 150 having conductive leads forming various electrical connections between or among different components of the exercise tracker 100. The leads may be etched from a conductive sheet laminated onto a non-conductive substrate. The circuit board 150 may be disposed on the base 135. The circuit board 150 may include a CPU or other form of processing device 180 and onboard memory (e.g., a data storage medium 185) to record and temporarily store data collected by the force sensor 130, accelerometer 160, or both (i.e. tension cycles, accelerometer movement).

The wireless communication device 155 may include any electronic component configured or programmed to facilitate wireless communication. For instance, the wireless communication device 155 may be programmed to transmit the data collected by the force sensor 130, accelerometer 160, or both via a telecommunication protocol such as Bluetooth®, Bluetooth Low Energy®, etc., to a remote device 190 (see FIG. 1) such as a mobile phone, smartwatch, or wearable activity tracker, or to a remote server 195 (see FIG. 1), such as a cloud-based server or a server associated with a particular facility (e.g., a gym). The term "remote" when used in the context of the remote device 190 and remote server 195 may refer to the spatial relationship of the remote device 190, the remote server 195, or both, relative to the exercise tracker 100. Therefore, although referred to as "remote," the remote device 190 and remote server 195 may be physically near the exercise tracker 100 (i.e., the remote server 195 may be in communication with the exercise tracker 100, the remote device 190, or both, via a local network connection). Alternatively, the remote device 190 or remote server 195, or both, may be physically "remote" but still in signal communication with the exercise tracker 100 (e.g., the remote server 195 may be cloud-based). Accordingly, in some implementations, the data may be transmitted from the exercise tracker 100 to the remote device 190 or the remote server 195 (see FIG. 1) via a Wi-Fi network connection. The wireless communication device 155 may be programmed to periodically transmit the collected data to the remote device 190 or remote server 195, or transmit the data as it is collected. Alternatively, the wireless communication device 155 may be programmed to transmit the data to the remote device 190 or the remote server 195 at specific times, such as when all repetitions have been performed on a particular piece of exercise equipment 105 or when a workout is complete. The wireless communication device 155 may determine that all repetitions have been performed based on the force sensor 130 signal or that the workout is complete in response to a user input provided to the exercise tracker 100 or remote device 190.

Pairing with the remote device 190 may include the wireless communication device 155 transmitting certain information to, and receiving certain information from, the remote device 190. In some possible scenarios, the wireless communication device 155 may transmit a unique identifier to the remote device 190. Likewise, the wireless communication device 155 may receive a unique identifier transmitted from the remote device 190. Instead of identifying the paired remote device 190 through the unique identifier, the wireless communication device 155 may be programmed to pair with the remote device 190 that has the strongest signal over a predetermined threshold, indicating that the remote device 190 is nearby and that the user of the remote device 190 is using the piece of exercise equipment 105 associated with the exercise tracker 100. Scanning for the unique identifiers by the wireless communication device 155 may be initiated by depression of a button 170 by the user at the beginning of a set of repetitions on the piece of exercise equipment, such as after the amount of weight resistance has been selected.

Instead of or in addition to signal strength, the wireless communication device 155 may pair with remote devices 190 based on signals received from the remote server 195. For instance, the remote server 195 may triangulate the locations of one or more remote devices 190, by signal strengths detected via the remote server 195 or other exercise trackers 100, and command each exercise tracker 100 to pair with the closest (or otherwise most appropriate) remote device 190. Instead of, or in addition to, triangulating based on signal strength, the remote server 195 may use an image processing technique to determine which remote devices 190 are near which exercise trackers 100. For instance, cameras or other image sensors can be used to detect the locations of particular remote devices 190, and the remote server 195 may generate the commands for the exercise trackers 100 to pair with particular remote devices 190 according to the images captured by the cameras. The wireless communication device 155 may receive the command from the remote server 195 and pair with the commanded remote device 190. Global Positioning Systems (GPS) or other geo-location functionality on the remote device 190 could also be used to identify the piece of exercise equipment being operated by the user.

The accelerometer 160 may include any electronic device programmed to detect motion of the exercise tracker 100 in one or more directions, including the direction of the cable 110. The motion of the exercise tracker 100 that can be detected by the accelerator may occur during exercise as, e.g., the stack of weights 115 is lifted from a starting position, cycled between positions during the exercise, and returned to the starting position. The accelerometer 160 may be programmed to generate and output signals representing such movement. The data representing the motion of the exercise tracker 100 collected by the accelerometer 160 may be processed by, e.g., the CPU, the remote device 190, or the remote server 195 to count the number of repetitions that were performed at the measured weight setting. The data can also be used to measure other characteristics such as the length of the stroke, the tempo of the repetitions, the speed of the motion, or the aggressiveness of the action. In one possible implementation, the accelerometer 160 may include one or more gyroscopes, such as a three-axis MEMS-based gyroscope, although a single axis of movement may be sufficient to provide all of the functionality described herein. The accelerometer 160 may be disposed on the circuit board 150 and may be configured to output the signals representing the detected movement via the leads incorporated into the circuit board 150.

The battery 165 may include any device configured to provide electrical energy to certain components of the exercise tracker 100. For instance, the battery 165 may be electrically connected to the force sensor 130, the circuit board 150 including the CPU, the wireless communication device 155, the accelerometer 160, the buttons 170, and the display screen 175 as well as any other peripheral devices mounted to the base 135. The battery 165 may be replaceable and, therefore, removably mounted to the base 135 via clips. Further, the base 135 may include leads that electrically connect the battery 165 to one or more other components when the battery 165 is mounted. In some possible approaches, the battery 165 may be charged by the movement of the cable 110. That is, the exercise tracker 100 may include a kinetic charging feature that harvests energy from the exercise motions exerted upon the cable 110 and stores the harvested energy in the battery 165. Energy can be harvested either from the linear oscillating motion of the device or through the force exerted onto the device via the tension exerted onto the cable 110.

The buttons 170 and display screen 175 may form a user interface device that allow a user to directly provide inputs to, and receive information from, the exercise tracker 100. For instance, the buttons 170 and display screen 175 may be used to provide user inputs associated with calibrating the exercise tracker 100 to work with a particular piece of exercise equipment 105, accessing data collected by the exercise tracker 100, identifying the person using the exercise equipment 105, displaying historical exercise data to the user, synchronizing the exercise tracker 100 with a remote device 190 or remote server 195, clearing the memory of the exercise tracker 100, etc. The exercise tracker 100 need not have any user interface device, however, since user inputs and outputs may be presented via, e.g., a paired remote device 190 such as a mobile phone, smartwatch, or wearable activity tracker. In another approach, the unique identifier associated with the mobile device 190 may be recorded by the exercise tracker 100 and transmitted directly to the remote server 195, via a local or wide area network connection, along with the details recorded about the exercise routine. User inputs may therefore be received at the paired remote device 190 and communicated from the paired remote device 190 to the exercise tracker 100. Outputs may be transmitted from the exercise tracker 100 to the paired remote device 190 where they may be displayed to the user. Thus, the remote device 190 may receive user inputs and present outputs to the user regardless of whether the exercise tracker 100 includes the buttons 170, display screen 175, or both.

The ability of the exercise tracker 100 to wirelessly communicate with external devices allows for a streamlined calibration protocol. Different manufacturers of exercise equipment 105 may use cables of varying diameter and/or varying cable coating types/thicknesses to reduce wear on the cables. The effect of varying these parameters is similar to varying the angle, θ, shown in FIG. 4A and, therefore, proper calibration can correct for such inconsistencies. The calibration process may include prompting the user to perform a specified number of repetitions at various weight settings and fitting the collected data to a curve to predict the force detected across the full range of possible weights. If the initial calibration detects that some weights might fall outside the bounds detectable by the force sensor 130, the calibration process may include prompting the user to add a shim to one or more of the protrusions 125 and/or alter its position using, e.g., an adjustment screw. In another approach, a component engaging the force sensor sensor could be replaced with one of a different size to achieve the desired amount of cable deflection. In an alternative approach, proper calibration may be achieved by prompting the user to follow a sequence of instructions through the display screen 175 incorporated into the exercise tracker 100 or the user's mobile device and fitting the collected data to a curve for the full range of weights. Alternatively, the calibration process may include prompting the user to elevate a known amount of weight and adjust the position of one of the protrusions 125 until the target force measurement is observed. In another approach, calibration may include prompting the user to elevate a known amount of weight and adjust a variable resistor to change the gain of an amplification circuit until the force sensor signal achieves a predetermined value.

In one possible scenario, the exercise tracker 100 may be "permanently" installed onto a piece of equipment. That is, the exercise tracker 100 may be attached to the cable 110 and left there for anyone using that piece of exercise equipment 105. Alternatively, the exercise tracker 100 may be easily removed so that a single user can carry around and attach the exercise tracker 100 to each piece of compatible exercise equipment 105 that the user uses during his or her exercise routine.

Figure 6:
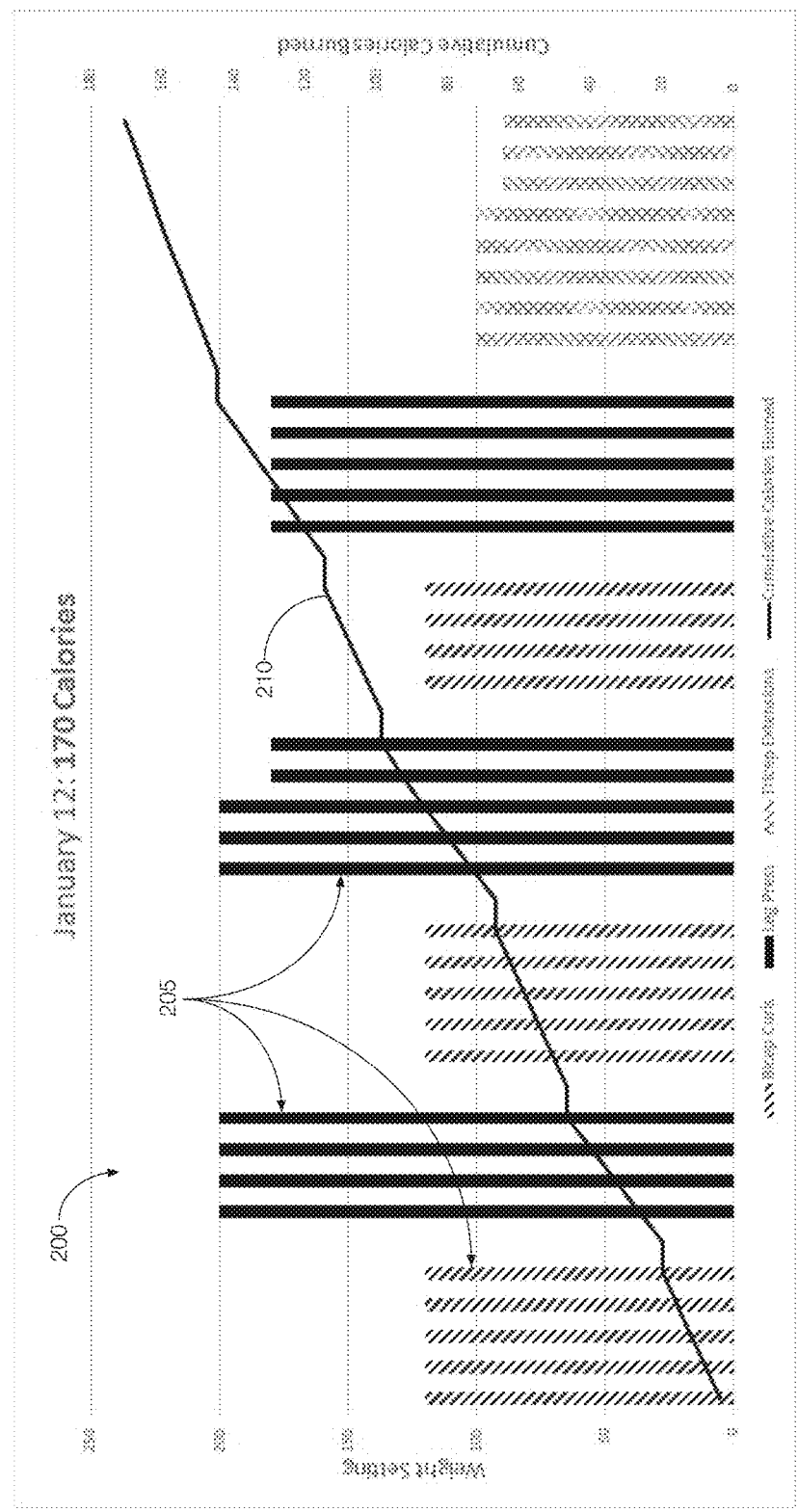
FIG. 6 illustrates sample data collected by the exercise tracker.

FIG. 6 shows example exercise data 200 that may be collected by one or more exercise trackers 100. In some instances, the data may be used only for purposes of counting repetitions. In other instances, the data may also be presented to the user via, e.g., a graphical user interface (see FIG. 7). When presented to the user, the data may provide a historical record of the user's exercise routine, or at least the portion of the exercise routine that uses exercise equipment 105 with the exercise tracker 100. Thus, the data may include the aggregate of the data collected from multiple exercise trackers 100, each associated with different pieces of exercise equipment 105. Further, different weights may be used, and different numbers of repetitions performed, at each piece of equipment. The data, therefore, may represent the amount of weight used, the number of repetitions performed, the number of sets performed, etc., during a workout.

The exercise data 200 may be generated by the processing device 180 incorporated into the exercise tracker 100. The processing device 180 may receive the force signal output by the force sensor 130, signals output by the accelerometer 160, or both, to generate the exercise data 200. Examples of exercise data 200 may include the magnitude of the weight lifted, the number of repetitions performed, the number of sets completed, etc. For instance, in the example of FIG. 6, the height of the bars 205 may represent the amount of weight lifted and the number of bars 205 may indicate the number of repetitions performed at that weight. Bars 205 representing repetitions performed on different pieces of exercise equipment 105 may be visually distinguishable. For instance, data collected from different pieces of exercise equipment 105 may be presented in different colors, line weights, and line types, etc. Thus, in instances where the same exercise tracker 100 is used on multiple pieces of exercise equipment 105, the exercise tracker 100 may relate the collected data to the particular piece of exercise equipment 105, and that relationship may be used to visually distinguish the data when viewed on a remote device 190 or computer monitor. In instances where the exercise tracker 100 is "permanently" attached to a piece of exercise equipment 105 (e.g., a situation where the exercise tracker 100 stays with the exercise equipment 105 instead of being carried around by a particular user), the exercise tracker 100 may attach an identifier to the data. The identifier may indicate on which piece of equipment the exercise was performed. Therefore, the data can be aggregated by the user's remote device 190 or the remote server 195, and the weight used, the number of repetitions, the number of sets, etc., for each piece of exercise equipment 105 can be maintained when the data is ultimately processed or presented to the user.

During the calibration sequence outlined previously, the user may be prompted to identify the piece of equipment, so there is a link between each individually-installed exercise tracker 100 and the exercise routine it is being used to track. In some instances, the calibration may be performed initially when the exercise tracker 100 is installed onto the exercise equipment 105. For pieces of exercise equipment 105 that have multiple uses, the user may be prompted to identify the exercise being performed. For instance, with reference to the example data shown in FIG. 6, the user may be prompted to confirm or otherwise identify that the exercise equipment 105 is being used to perform a triceps extension. When the user moves to a different piece of exercise equipment 105 or uses the same piece of equipment for a different exercise, the user may be prompted to confirm or otherwise identify that the exercise equipment 105 is now being used to perform a different exercise. For instance, still referring to the example data of FIG. 6, the user may be prompted to confirm or otherwise indicate that the user is performing a leg press or biceps curls when using the exercise equipment 105 associated with those exercises.

With continued reference to FIG. 6, the line 210 may represent the cumulative amount of calories burned in that day's sequence of exercise routines. The calories burned from each individual repetition can be determined by multiplying the weight being lifted by the total distance it travelled, both of which may be calculated by the exercise tracker 100 via the force sensor 130 and the accelerometer 160, respectively. Alternatively, the total cumulative amount of weight lifted could produce a single metric to summarize the productivity of a workout.

Figure 7:
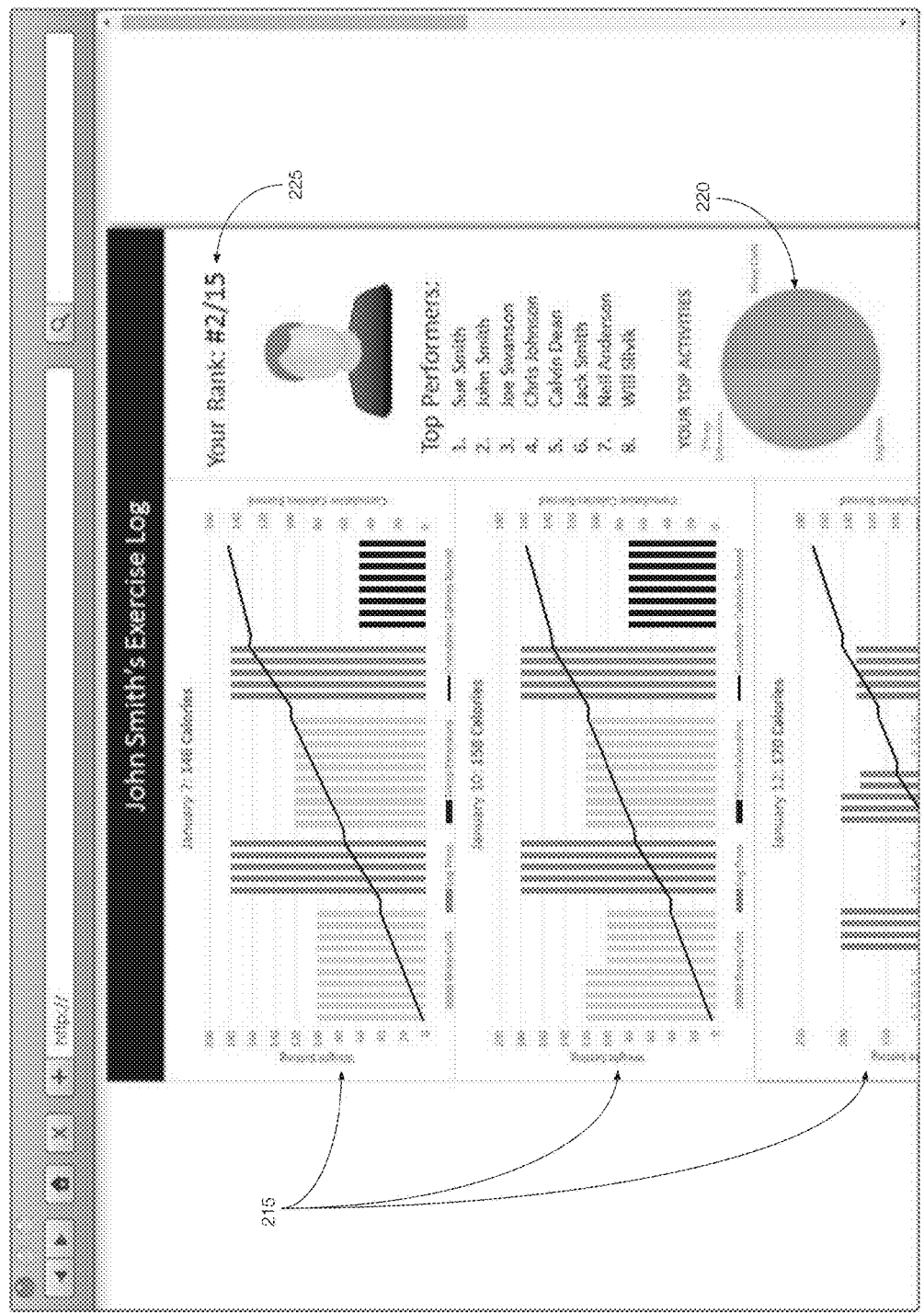
FIG. 7 illustrates a graphical user interface for presenting the data collected by the exercise tracker.

FIG. 7 illustrates an example graphical user interface that may be used to present the data collected by one or more exercise trackers 100 during a workout session to a user. The graphical user interface may be presented via a remote device 190, such as a smartphone, a wearable activity tracker, a smartwatch, or a computer which may include a desktop, a laptop, or tablet computer. As shown, the graphical user interface may present historical exercise data 215, which may correspond to the data discussed above with reference to FIG. 6. Further, the graphical user interface may track and illustrate behavior and performance trends in a trend area 220. Further, the graphical user interface may include a motivation field 225 that can be used for providing data that may motivate the user to continue to use the exercise tracker 100. For instance, as shown, the motivation field 225 may include a user's rank relative to other people who have used exercise trackers 100 at the same or different location as the user. Besides rank, other forms of gamification may be used to provide motivation to the user to continue to exercise. If the data shown in the motivation field 225 relies upon data collected from the user or other people, for purposes of privacy, the graphical user interface may allow the user to limit who, if anybody, can see the user's data or subsets of the user's data. For instance, the motivation field 225 may only represent data collected from a small subset of people explicitly approved by the user. The interface may also allow the user to set specific goals and receive targeted motivational instructions to help the user achieve those goals. Feedback can be given to the user during their exercise routine in the form of messages on the device display screen 175. Notifications may also be issued on the remote device 190 as a way to motivating the user toward achievement of goals, and vibration of the remote device can be used to indicate achievement of these goals without the need for visual monitoring by the user.

The exercise tracker 100 may compile and shares the data through a dedicated portal implemented via a remote server 195. That is, any exercise tracker 100 used by the user may transmit the user's data to the remote server 195 where it may be aggregated and processed. The remote server 195 may present the graphical user interface with the data in response to a server request made by the user's mobile device, computer, etc. The data may be synchronized with the remote server 195 periodically, before a new user uses the exercise tracker 100, in response to a user input, in response to a query from the remote server 195, etc. In some implementations, the remote server 195 may act as a "master" to one or more "slave" exercise trackers 100.

In some possible scenarios, the data may be shared with other fitness-tracking or health-related websites that aggregate data from multiple devices/sources. For instance, the data collected by the exercise tracker 100 may be shared with a user's physician via a website. Communication with various devices or sources may be facilitated via a third party aggregation site, an application programming interface (API) associated with the exercise tracker 100, or the like.

Figure 8A:
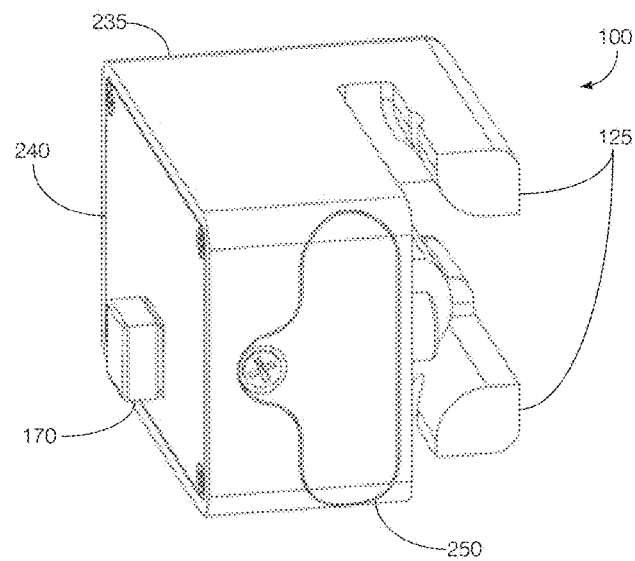
FIGS. 8A-B illustrate isometric and exploded views, respectively of another form factor for the exercise tracker.
Figure 8B:
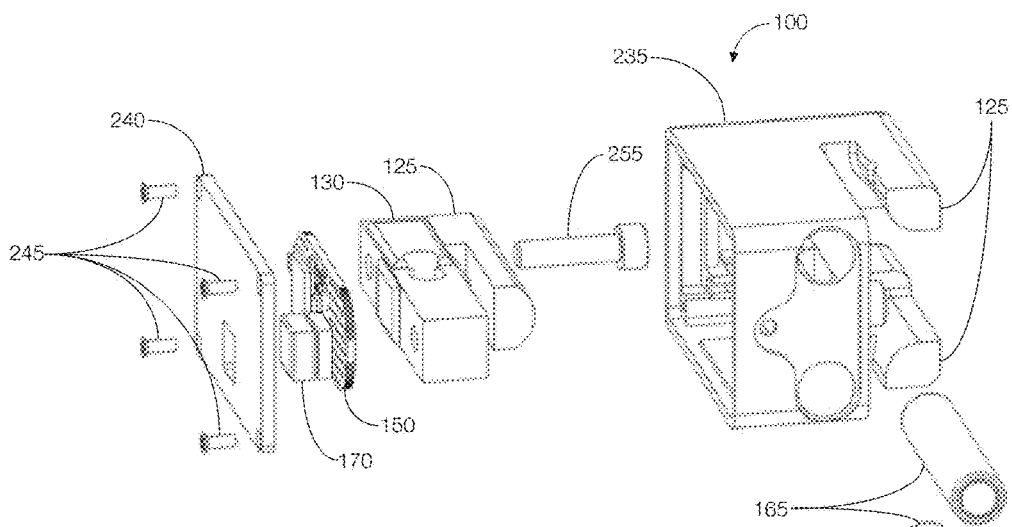

As discussed above, the exercise tracker 100 may have many different configurations. One alternative configuration is illustrated in FIGS. 8A-8B. In the exercise tracker 100 of FIGS. 8A-8B, presented in an isometric view (FIG. 8A) and an exploded view (FIG. 8B), the exercise tracker 100 includes a housing 235 (serving as the base 135, discussed above) and a cover 240 configured to house the various components including the force sensor 130 (shown as a load cell), the circuit board 150, the batteries 165, etc. For purposes of simplicity, other components such as the wireless communication device 155, accelerometer 160, processing device 180, and data storage medium 185 are not explicitly labeled in FIGS. 8A-8B but may be housed in the housing 235 on, e.g., the circuit board 150.

The protrusions 125 in FIGS. 8A-8B are illustrated as lever arms that can attach to the cable 110, which as discussed above may have any number of cross-sectional shapes. The cover 240 may attach to the housing via a fastener 245, and the housing 235 may further include a battery door 250 to allow the batteries 165 to be easily and quickly removed. Further, one or more screws 255 may be used to adjust the tightness of the protrusions 125 (e.g., the lever arm) relative to the cable and to connect the protrusion 125 to the force sensor 130.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An exercise tracker comprising:
   a base;
   a plurality of protrusions, extending from the base, for contacting a cable associated with a piece of exercise equipment having a variable weight stack and a pulley for receiving the cable, wherein the plurality of protrusions are configured to attach the base to the cable between the pulley and the variable weight stack, wherein a location of one of the plurality of protrusions is adjustable via a positioning screw, and wherein the base moves in accordance with movement of the cable;
a force sensor programmed to output a force signal representing a force applied to the cable; and
a processor programmed to receive the force signal and determine, from the force signal, exercise data including an amount of weight lifted.

2. The exercise tracker of claim 1, wherein the force sensor includes a tension meter disposed on the cable, and wherein the force sensor is programmed to output the force signal in response to tensioning the cable.

3. The exercise tracker of claim 1, further comprising a data storage medium, wherein the processor is programmed to store the exercise data in the data storage medium.

4. The exercise tracker of claim 1, further comprising a wireless communication device programmed to wirelessly transmit the exercise data.

5. The exercise tracker of claim 1, further comprising an accelerometer programmed to detect movement of the exercise tracker and output signals to the processor, wherein the processor is programmed to determine a number of calories burned based at least in part on the signals output by the accelerometer.

6. The exercise tracker of claim 1, further comprising a battery electrically connected to at least one of the force sensor and the processor.

7. The exercise tracker of claim 6, wherein the battery is configured to receive electrical energy generated by moving the cable.

8. The exercise tracker of claim 1, wherein the one of the plurality of protrusions is cantilevered from the base.

9. The exercise tracker of claim 8, wherein tensioning the cable deflects the one of the plurality of protrusions in a direction perpendicular to a direction of the tensioning of the cable.

10. The exercise tracker of claim 8, wherein the force sensor is disposed on or by at least one of the plurality of protrusions.

11. The exercise tracker of claim 1, wherein the cable includes a first cable segment and a second cable segment, and wherein the force sensor is disposed between the first and second cable segments and configured to measure a force applied to at least one of the first and second cable segments.

12. A system comprising:
a remote device; and
an exercise tracker, fixed to a cable of a piece of exercise equipment, and programmed to determine an amount of weight lifted and a number of repetitions performed in accordance with a deflection by the cable of one of a plurality of protrusions of the exercise tracker, wherein a location of the one of the plurality of protrusions is adjustable via a positioning screw,
wherein the piece of exercise equipment further includes a variable weight stack and a pulley for receiving the cable and wherein the exercise tracker is configured to attach to the cable between the pulley and the variable weight stack,
wherein the exercise tracker is programmed to wirelessly transmit the amount of weight lifted and the number of repetitions performed to the remote device, and
wherein the exercise tracker moves in accordance with movement of the cable.

13. The system of claim 12, wherein the exercise tracker includes a force sensor disposed on one of the plurality of protrusions and configured to detect a force applied to the cable and programmed to generate a force signal in accordance with the force applied to the cable.

14. The system of claim 12, wherein the exercise tracker includes a data storage medium programmed to store the amount of weight lifted and the number of repetitions performed.

15. The system of claim 12, wherein the exercise tracker includes a wireless communication device programmed to wirelessly transmit the amount of weight lifted and the number of repetitions performed to the remote device.

16. The system of claim 12, wherein the exercise tracker includes an accelerometer programmed to detect movement of the exercise tracker and generate signals corresponding to the movement of the exercise tracker, wherein the exercise tracker is programmed to determine the amount of weight lifted and the number of repetitions performed based at least in part on the signals generated by the accelerometer.

17. The system of claim 12, wherein the exercise tracker includes a base and wherein the one of the plurality of protrusions is cantilevered from the base.

18. The system of claim 17, wherein tensioning the cable deflects the one of the plurality of protrusions in a direction perpendicular to a direction of the tensioning of the cable.

19. The system of claim 12, wherein the exercise tracker is disposed on the cable between the pulley and the variable weight stack of the piece of exercise equipment.

20. An exercise system comprising:
exercise equipment having a variable weight stack, a pulley, and a cable attached to the variable weight stack and passed through the pulley; and
an exercise tracker attached to the cable, the exercise tracker having:
a base;
a plurality of protrusions extending from the base, wherein a location of one of the plurality of protrusions is adjustable via a positioning screw, and wherein the exercise tracker is configured to move vertically in accordance with movement of the cable;
a force sensor programmed to output a force signal representing a force applied to the cable; and
a processor programmed to receive the force signal and determine, from the force signal, exercise data including an amount of weight lifted.

* * * * *